United States Patent
Sharoof et al.

(10) Patent No.: US 11,855,424 B2
(45) Date of Patent: Dec. 26, 2023

(54) THREADED GRASPING SYSTEM AND METHOD

(71) Applicant: Lassol Ltd., Isifya (IL)

(72) Inventors: Raed Sharoof, Isifya (IL); Eyal Sharoof, Isifya (IL)

(73) Assignee: Lassol Ltd., Isifya (IL)

( * ) Notice: Subject to any disclaimer, the term of this patent is extended or adjusted under 35 U.S.C. 154(b) by 0 days.

(21) Appl. No.: 18/200,166

(22) Filed: May 22, 2023

(65) Prior Publication Data

US 2023/0291185 A1 Sep. 14, 2023

Related U.S. Application Data

(63) Continuation of application No. PCT/IL2023/050100, filed on Jan. 30, 2023.

(30) Foreign Application Priority Data

Jan. 31, 2022 (IL) .......................................... 290264

(51) Int. Cl.
 *H02G 1/08* (2006.01)
 *B25B 7/22* (2006.01)

(52) U.S. Cl.
 CPC .............. *H02G 1/085* (2013.01); *B25B 7/22* (2013.01)

(58) Field of Classification Search
 CPC .. H02G 1/085; B25B 7/22; B25B 7/12; B25B 7/02; B25B 7/00
 See application file for complete search history.

(56) References Cited

U.S. PATENT DOCUMENTS

| | | | |
|---|---|---|---|
| 1,782,871 A | 11/1930 | Fischer | |
| 2,606,466 A | 8/1952 | John | |
| 3,018,531 A * | 1/1962 | Arsenault | F16G 11/101 188/65.1 |
| 3,312,128 A * | 4/1967 | Wasson | E04G 21/122 81/487 |
| 3,628,221 A * | 12/1971 | Pasbrig | F16B 2/08 439/783 |
| 4,819,911 A | 4/1989 | Cielker | |
| 5,749,371 A * | 5/1998 | Zadini | A61M 25/09041 600/585 |
| 6,050,438 A * | 4/2000 | Kovens | B65D 11/02 220/4.24 |
| 6,431,035 B1* | 8/2002 | Hendrikse | B25B 7/02 81/417 |
| 8,603,011 B2* | 12/2013 | Landowski | A61M 25/09041 604/528 |
| 8,911,487 B2* | 12/2014 | Bennett | A61M 25/01 623/1.11 |
| 2007/0169594 A1 | 7/2007 | Reckhart | |

OTHER PUBLICATIONS

International Search Report and Written Opinion dated May 8, 2023 in PCT International Patent Application No. PCT/IL2023/050100, 9 pages.

* cited by examiner

*Primary Examiner* — Seahee Hong
(74) *Attorney, Agent, or Firm* — Snell & Wilmer L.L.P.

(57) ABSTRACT

An apparatus configured to grasp, including a lower and upper arms that are hingedly connected by a first hinge, an elastic element maintaining the apparatus in a non-operative state, a guiding route located below or above at least one of the arms, configured to receive a section of a threading aspect, wherein during an operative state, a simultaneous press of the two arms, one towards the other, applies a grasping force.

15 Claims, 11 Drawing Sheets

THREADED GRASPING SYSTEM AND METHOD

CROSS-REFERENCE TO RELATED APPLICATIONS

This application is a continuation application, under 35 U.S.C. § 111(a) of international patent application No. PCT/IL2023/050100, filed Jan. 30, 2023, which claims priority to Israel patent application No. 290264, filed Jan. 31, 2022, the entire disclosures of all of which are herein incorporated by reference as a part of this application.

FIELD OF THE INVENTION

The invention relates to the field of tools used during electrical construction. More specifically, the invention relates to a gripping apparatus for assisting an electrician in pulling through a tube a threading device tied to electrical cables.

BACKGROUND OF THE INVENTION

Main electrical wires within walls of houses and buildings are typically contained within dedicated tubes. A single home typically includes tens of tubes, while an office building or a larger structure includes many thousands of such tubes. The length of each tube depends on the specific electrical design of the site and may range between several meters to tens of meters. The tubes are placed within the site's walls during an early stage of the walls' construction, based on the electrical scheme of the site. The tubes are typically flexible, made of plastic or PVC (or similar), have a diameter typically between ¾" to 1", and serve two main purposes: (a) ease positioning of the electrical wires between two respective wall locations; and (b) protecting the wires from wetness, temperature, and other environmental variations in the long term. Each tube is designed to contain at least two, generally three or more electrical wires.

Similar to electrical wires, other types of wires or cables (namely several wires enveloped within a common sleeve) are inserted into tubes. For example, network cables are also inserted into tubes similar to the main electrical cables. The invention's apparatus can grip all the variety of cables that are inserted (or threaded) into tubes. Hereinafter, the terms "wires" or "electrical wires" encompass various wires or cables inserted into tubes.

The electrical wires themselves are typically threaded to within each tube at the last stage of the construction. However, this is not an easy task, as the wires' length and rigidity, curves of the tube, and friction do not allow pushing the wires from a proximal tube's end to the tube's distal end. To carry out this task, electricians use a dedicated threading device. The threading device includes a long and relatively rigid cord (made of plastic, metal, or combination thereof), sometimes with a "hook" or similar at its distal end configured for attachment to an end of the electrical wires. From the proximal end of the tube, the electrician pushes the cord until it arrives at the tube's remote (distal) end (hereinafter, this stage is referred to as the "pushing stage"). Once the distal end of the cord arrives at the tub's remote end, the electrician rigidly attaches the proximal end of the electrical wires to the hook at the distal end of the cord (for example, utilizing an electrician tape or similar—this stage is referred to as the "attaching stage"). Once attached, the electrician returns to the proximal tube's end and pulls the cord, together with the attached electrical wires, through the entire tube until the proximal end of the wires arrive at the proximal end of the tube (this stage is referred to as the "pulling stage"). As noted, the tube applies significant friction on the cord and wires given curves along the tube's route, this friction increases as the tube becomes longer. To overcome the friction, the electrician typically applies an oily grease within the tube and on the external surface of the threading device's cord. While this grease somewhat eases the pushing-pulling operations as it reduces the tube's friction, it still causes another problem. More specifically, the pulling of the cord during the pulling stage becomes harder, as the oily grease requires the electrician to overcome the reduced friction between his hands and the cord during the pulling stage. Typically, performing such repeated operations is hard for the electrician, even damaging his hands' skin. Furthermore, a repeat performance of such operation damages the user's skin and damages the threading cord itself, given the force involved and manipulation of the cord by the user.

Moreover, there are cases where an electrician needs to replace old wires or cables located within tubes with newer (or different) ones. Such replacement requires (a) pulling the existing cables; and (b) replacing them with newer ones. The pulling of the old cables (or wires) is similar in its nature to the pulling of the threading cord. The solution provided by the invention encompasses this type of pulling as well.

As noted, there are cases when the electrician performs these pushing-attaching-pulling operations tens times a day. Therefore, it becomes necessary to provide a solution that eases at least the hardest operation, namely pulling the cord and wires during the pulling stage.

The prior art suggests an electrically-based apparatus for pushing and pulling the cord of a threading device. However, these electrically-based apparatus are expansive, relatively heavy, complicated in structure and operation, and are typically used when the length of the tube is longer than ten meters.

It is, therefore, an object of the invention to provide a gripping apparatus for gripping a cord of a threading device that electricians use to insert electrical wires into tubes.

Another object of the invention is to provide such apparatus in a simple and low-cost structure.

Still, another object of the invention is to provide additional functions within the gripping apparatus of the invention.

Additional advantages of the invention become apparent as the description proceeds.

SUMMARY OF THE INVENTION

The invention relates to a one-hand manually operated apparatus configured to grip a threading cord, comprising: (a) lower and upper arms that are hingedly connected by a first hinge; (b) an elastic element maintaining the apparatus in a non-operative state; (c) a guiding route located below or above at least one of the arms, configured to receive a section of the threading cord; (d) wherein during an operative state, a simultaneous press of the two arms, one towards the other, applies a gripping force on said section of the threading cord.

In an embodiment of the invention, said gripping force is applied on the cord either directly by the two arms, or indirectly by at least one said two arms activating an intermediate component, respectively.

In an embodiment of the invention, said intermediate component is located between a respective one of said two arms and the cord.

In an embodiment of the invention, the arm that activates the intermediate component is the upper arm.

In an embodiment of the invention, the intermediate component comprising at its first end a surface contacting the cord, and at its opposite end a second hinge that hingedly connects the intermediate component to the respective force-applying arm.

In an embodiment of the invention, the contacting surface is configured as an inverted-V in cross-section.

In an embodiment of the invention, the guiding route is located within the lower arm, and the lower arm further comprising elements for maintaining the cord within the guiding route.

In an embodiment of the invention, the elastic element is a spring.

In an embodiment of the invention, the apparatus further comprising a wire-cutter said cutter comprising a first blade attached to the upper arm and a second blade attached to the lower arm.

In an embodiment of the invention, the apparatus further comprising within the guiding route a slot configured to receive a selectable pad of respective height, thereby enabling operation with different cord's diameters.

In an embodiment of the invention, the slot and each of said pads have compatible slanted surfaces to secure the pad within the slot.

In an embodiment of the invention, the apparatus further comprising an opening at a side of the respective arm configured to allow pushing the pad out of the slot.

In an embodiment of the invention, the first hinge is positioned on a vertical extension from said lower arm.

In an embodiment of the invention, the vertical extension at least partially encloses the intermediate component, and wherein said intermediate component enters the guiding route through an opening at a top platform of said lower arm.

In an embodiment of the invention, a top surface at said intermediate component is in continuous contact with a curved surface at the bottom of said upper arm.

DETAILED DESCRIPTION OF PREFERRED EMBODIMENTS

Figure 5:
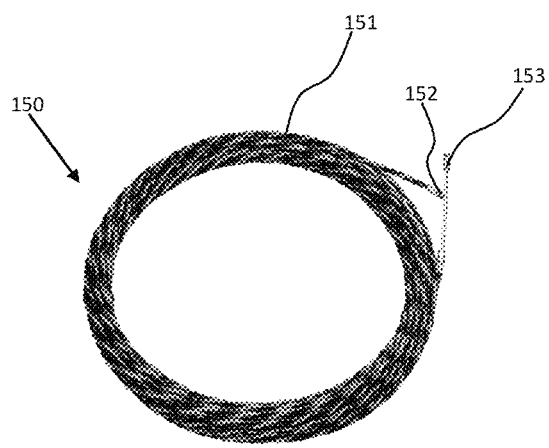
FIG. 5 shows a typical threading device.

As noted, the introduction of electrical wires to within tubes is typically performed at a relatively late building construction stage. A dedicated threading device 150, shown in FIG. 5, is used to carry out this task. Threading device 150 includes a cord 151, a distal end 153, and a proximal end 152. The cord 151 is typically flexible but with a longitudinal stiffness to allow it to safely protrude the tube from its proximal end until reaching the tube's distal end. As noted, the insertion of electrical wires to within a tube involves three stages: (a) the pushing stage in which cord 151 is pushed from a proximal location until its distal end 153 arrives at the distal end of the tube (not shown); (b) an attaching stage in which the electrical wires (not shown) are firmly attached to the distal end 153 of the threading device 150; and (c) a pulling stage in which the cord 151, together with the attached electrical wires are pulled from the proximal location until the proximal end of the cord, and attached electrical wires arrive at the proximal end of the tube. At that stage, the electrical wires are entirely within the tube, and the proximal end of the electrical wires can be disconnected from the distal end of the threading device. At the distal and proximal ends of the tube, the electrical wires can be cut to the desired size. As also noted, during the pushing and the pulling stages, the cord (and the electrical wires only during the pulling stage) suffer from significant friction from the tube. Therefore, electricians typically use oily grease to reduce friction. This grease, however, disturbs the gripping of the cord by the user's hands. In total, this task becomes relatively hard, particularly when repeated many times during the day and with long electrical wires and tubes. The manual, one-hand gripping apparatus of the invention significantly reduces the electrician's efforts, at least during the pulling stage, which is the hardest to perform. The apparatus can also reduce the electrician's efforts during the pushing stage by providing a safe and firm grip of the cord.

Figure 1:
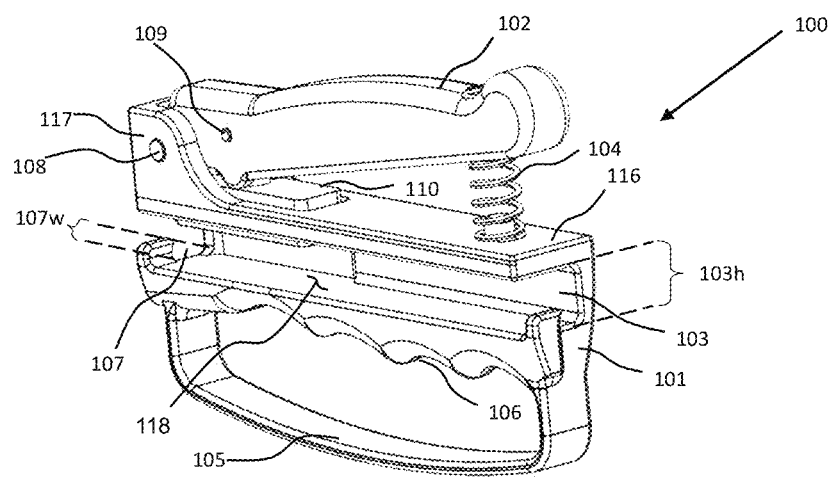
FIG. 1 shows a first embodiment of the apparatus in a first perspective view.
Figure 2:
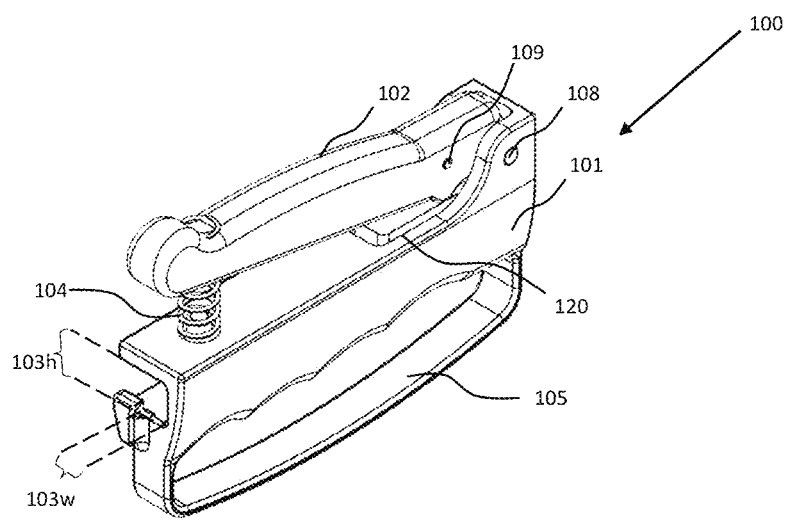
FIG. 2 shows the first embodiment of the apparatus in a second perspective view.
Figure 3:
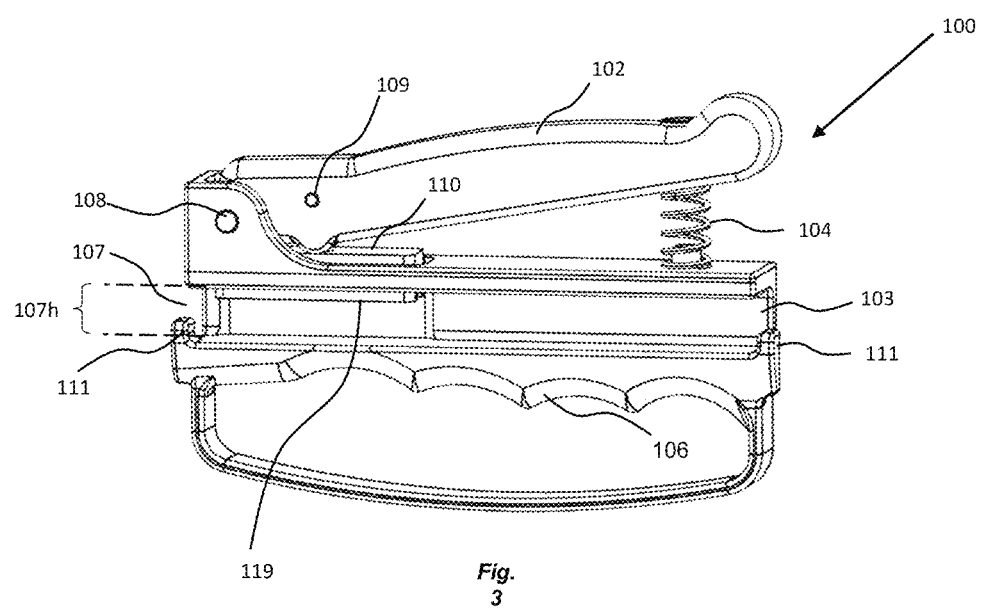
FIG. 3 shows the first embodiment of the apparatus in a side view.
Figure 4:
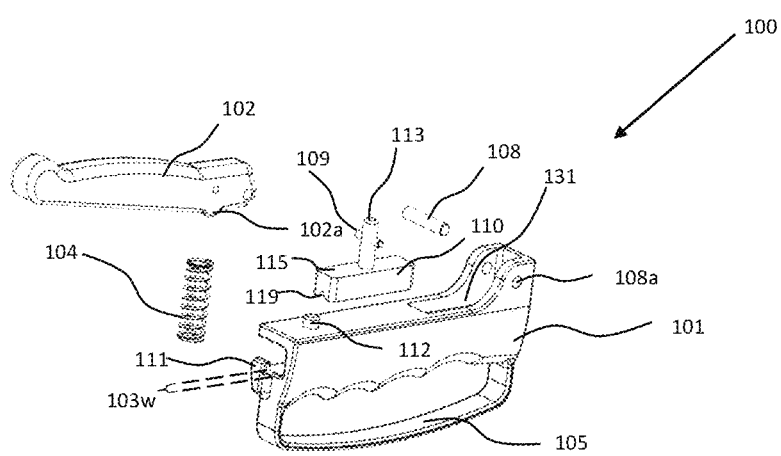
FIG. 4 shows an exploded view of the first embodiment of the apparatus.

A first embodiment of the invention's apparatus is shown in FIGS. 1-4. FIGS. 1 and 2 show the apparatus in two different perspective views, FIG. 3 shows the apparatus in a side view, and FIG. 4 shows an exploded view of the apparatus.

The apparatus of the invention, in its basic form, includes a lower arm and an upper arm that are hingedly connected, a guiding route configured to receive a threading cord, and an elastic element (such as a spring, telescopic elastic component, etc.) that normally maintains the apparatus in a non-operative state. The apparatus is configured to firmly grip the threading device's cord during an operative state. The firm gripping of the cord is typically carried out within the guiding route in one of two options: (a) direct simultaneous contact of respective surfaces of both the upper and lower arms with the cord; or (b) as shown in the example of FIGS. 1-4, indirect contact by use of an intermediate component, while directly contacting the cord by only a surface of one of the two arms within the guiding route (in this specific case, only the lower arm), while the intermediate component, which is activated by the second arm, complements the gripping.

Reference is now made to FIGS. 1-4 in more detail. The lower arm 101 forms the main body of the apparatus. It includes a fingers' grasping section 106, an optional enclosure 105, a guiding route 107 configured to receive a section of the threading device's cord, a top platform 116 (FIG. 1), and top extension 117 that in turn includes a main hinge-hole 108a (FIG. 4). Protrusion 112 (FIG. 4), positioned on the upper surface of the top platform, stably receives and maintains a first end of the spring 104 at the desired position, ensuring a normally non-active state of the apparatus (a similar protrusion may exist in the upper arm). The other end of spring 104 pushes the upper arm 102 upward (during a non-operative state of the device). The terms "up" and "down", unless specifically indicated otherwise, refer to the orientations shown in the drawings, for example FIGS. 1-4 and FIGS. 6-9A. The terms "proximal" and "distal" are defined relative to the user at the cord's pulling location. Guiding route 107 has a generally U-shaped configuration in cross-section and is configured to receive a section of cord 151. Extensions 111 are configured to secure the cord in place within the guiding route. Guiding route 107 may have a width opening of 103w and a height opening of 103h (see FIG. 1, both of which delimit the diameter of the cord that guiding route 107 can host.

The upper arm 102 is hingedly connected to the lower arm 101 utilizing hinge 108 (FIG. 4) at hinge point 108a. The upper arm 102 is configured to receive the palm of the user during operation. The upper arm 102 is also hingedly connected to intermediate component 110 (FIG. 4) utilizing hinge 109. Furthermore, the curved bottom surface 102a of the upper arm 102 maintains contact with top surface 115 of intermediate component 110. The intermediate component 110 is configured to slide vertically within a dedicated hollow space 131 formed at the bottom arm 101 and transfers an amplified top-gripping force from upper arm 102 to the cord surface disposed at the guide route 107. A vertical post 113 extends from upper surface 115 of intermediate component 110 and includes secondary hinge 109 for connection with upper arm 102. Preferably, the bottom surface 119 of intermediate component 110 preferably has an inverted-V configuration in cross-section to fit the shape of the cord 151 better and provide a firm gripping during the operation state of the apparatus. Optinally, the bottom surface 120 of intermediate component 110 is flat. At least the bottom of the intermediate component may be made of rubber to provide a firm gripping that does not damage the cord 151 itself. The variety of components of the apparatus may be made of rigid plastic, metal (for example, aluminum or nickel), rubber, or a combination thereof.

The intermediate component is shown in FIGS. 1-4 as being driven by the upper arm 102. In some embodiments, the intermediate component may be driven by the lower arm 101. In another alternative (for example, the embodiment of FIGS. 9A-9C), the gripping may be carried out directly between the upper arm's bottom surface and the lower arm's top surface (both at the guide route), gripping the cord 151 within the guiding route.

In operation, when a necessity arises to pull cord 151 and electrical wires attached to it through a tube, the user comes to the proximal end of the tube, inserts a section of cord 151 into guide 107, and firmly applies force on the two arms 101 and 102. The application of force on upper arm 102 pushes the intermediate component 110 downward towards the top surface of cord 151. This force firmly grips the cord between the bottom surface (119 or 120) of component 110 and the lower surface 118 of guide 107, allowing the user to easily pull the cord and electrical wires attached to it through the tube. Once a section of cord 151 is pulled from within the tube, the user can release the pressure (returning the apparatus to its non-operative state), advance the apparatus along the newly revealed cord's section (while still maintaining the cord within the guide route 107), and again apply force to pull an additional section of cord 151. This operation may repeat several times until completing the task.

The apparatus of the invention may be utilized to pull not only a cord of a threading device but also cables and wires themselves when replacement of them is required. In such a case, the invention apparatus grips the wires (or cables) directly, enabling the user to pull them from the tube, before replacing them with new ones.

Figure 6:
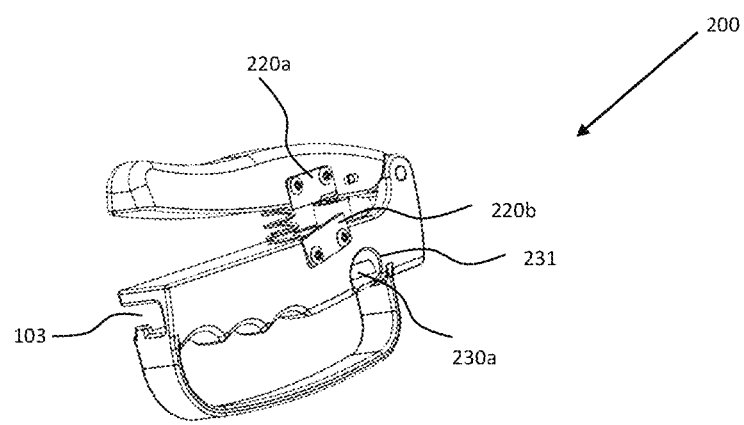
FIGS. 6 to 8 show different perspective views of a second embodiment of the apparatus.
Figure 7:
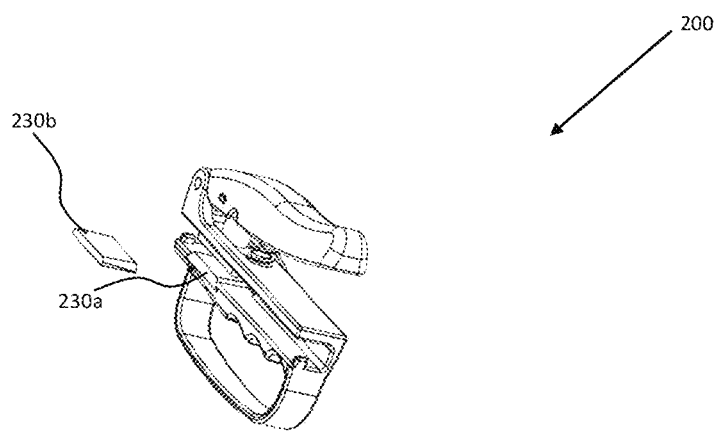
Figure 8:
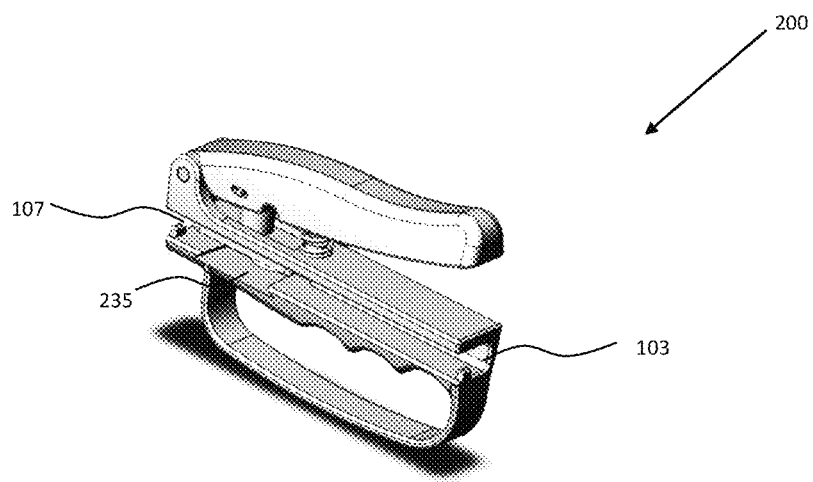

FIGS. 6, 7, and 8 show an apparatus 200, in various perspective views, according to a second embodiment. Apparatus 200 is configured to handle cords of different diameters. As shown in FIG. 8, the apparatus includes a slot 235 within the guiding route 107 configured to receive a selectable bottom pad. Bottom pad 230a or 230b is selected based on the desired height, which best suits the cord 151 diameter while enabling a firm cord grip. As shown, the configuration of slot 235 is designed to match the configuration of the pad. In this case, the right and left sides of the pad are slanted, and slot 235 has oppositely slanted side facets. When it becomes necessary to replace the pad with a different height pad, the user pushes the existing pad via opening 231 (FIG. 6), removes it, and inserts the alternative pad 230b.

Apparatus 200 also includes a cutter to cut the electrical wires after positioning them within the tube (or in other circumstances). The cutter includes two side-blades 220a and 220b attached to one side of the apparatus. The cutting operation is self-explanatory, given the drawings.

Figure 9A:
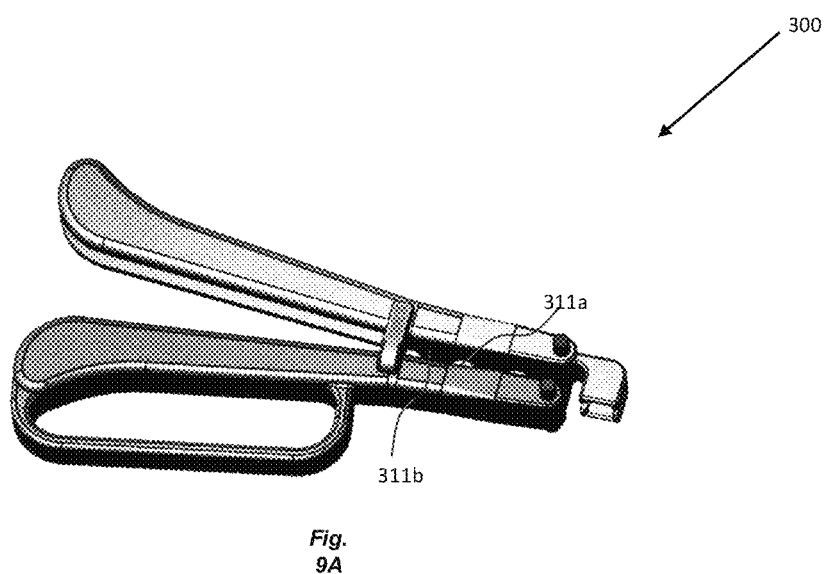
FIGS. 9A to 9C are images showing a third embodiment of the invention.
Figure 9B:
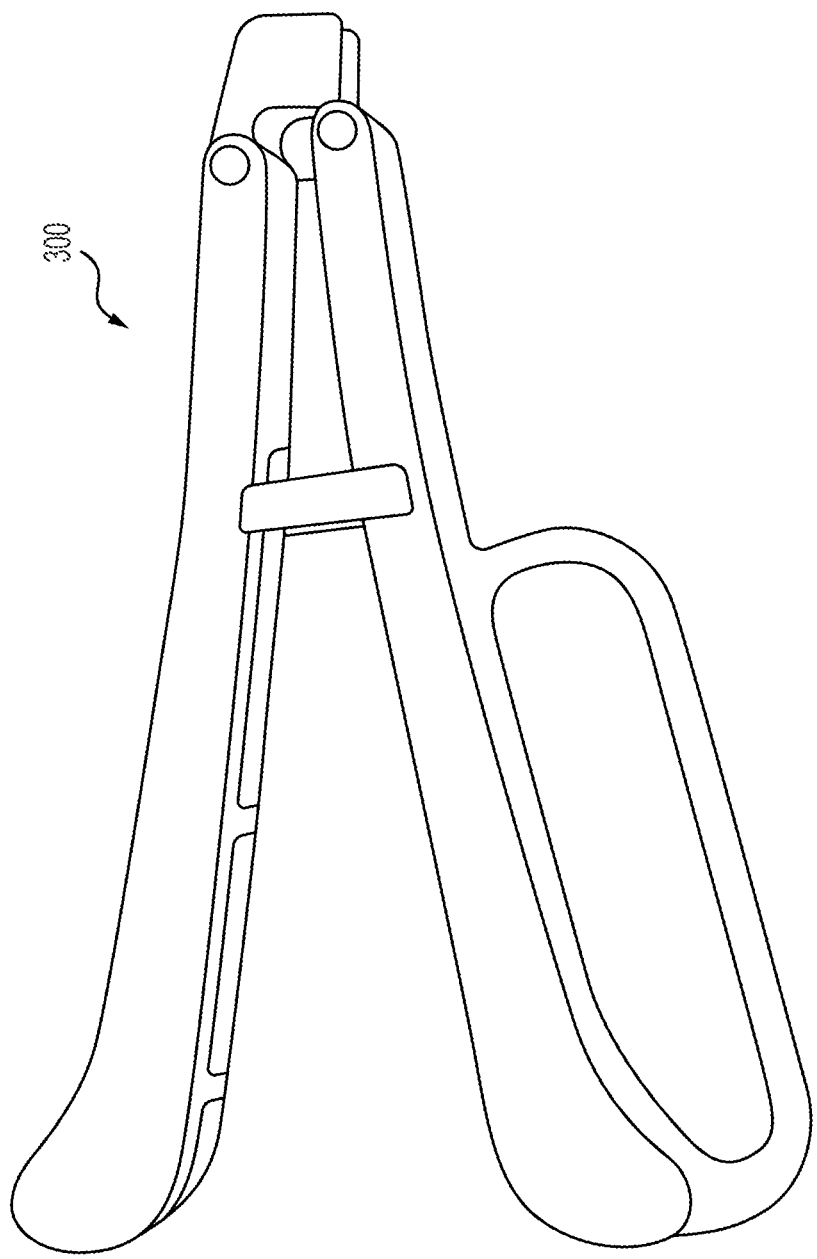
Figure 9C:
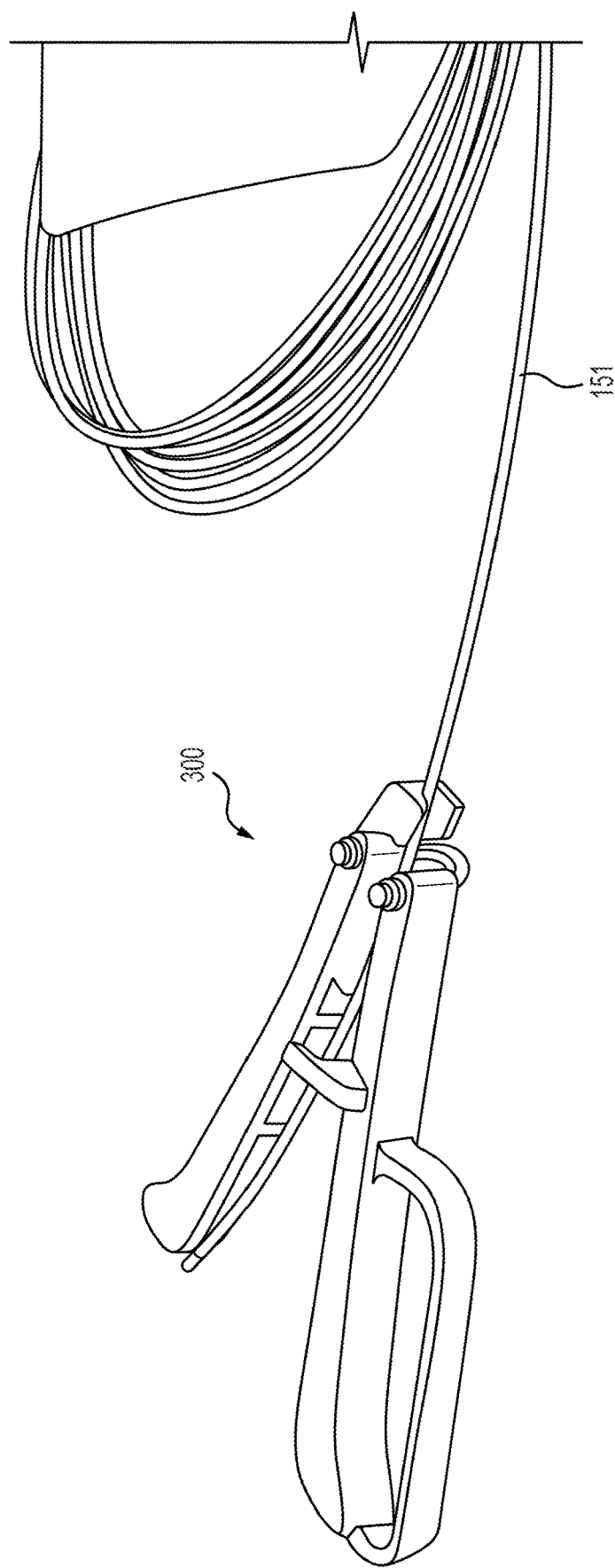

FIGS. 9A to 9C show a gripping apparatus 300 according to a third embodiment of the invention. The two arms of apparatus 300 grip the cord 151 directly, without utilizing an intermediate component 110. As shown in FIG. 9A and 9C, cord 151 is gripped directly by surfaces 311a and 311b of the two arms, respectively.

While some embodiments of the invention have been described by way of illustration, it is apparent that the invention can be carried into practice with many modifications, variations, and adaptations, and with the use of numerous equivalent or alternative solutions that are within the scope of persons skilled in the art, without departing from the spirit of the invention or exceeding the scope of the claims.

What is claimed:

1. A pulling threading apparatus, comprising:
a lower arm and an upper arm, wherein a first end of the lower arm is hingedly connected to a first end of the upper arm by a first hinge;
a spring connected between a second end of a top platform of the lower arm and a second end of upper arm maintaining the apparatus in a non-operative state; and
a guiding route located below the upper arm and above the lower arm, the guided route configured to receive a section of a threading cord;
wherein, during an operative state, a simultaneous press of the upper arm towards the lower arm applies a grasping force on the section of the threading cord;
wherein the grasping force is applied on the threading cord either directly by the upper arm and the lower arm or indirectly by the upper arm activating an intermediate component; and
wherein the intermediate component comprises a bottom surface contacting the threading cord and a top surface that hingedly connects the intermediate component, via a second hinge, to the upper arm, wherein the bottom surface contacting the threading cord has a shape configured to fit the shape of the threaded cord in cross section along a length of the intermediate component parallel to the section of the threading cord.

2. The apparatus of claim 1, wherein the intermediate component is located between a respective one of the upper arm or the lower arm and the threading cord.

3. The apparatus of claim 1, wherein the upper arm that activates the intermediate component.

4. The apparatus of claim 1, wherein sa the shape is an inverted V.

5. The apparatus of claim 1, wherein the guiding route is located within the lower arm, and the lower arm further comprising extensions for maintaining the threading cord within the guiding route.

6. The apparatus of claim 1, further comprising a fingers' grasping section of a main body.

7. The apparatus of claim 1, wherein the first hinge is positioned on a vertical extension from the lower arm.

8. The apparatus of claim 7, wherein the vertical extension at least partially encloses the intermediate component, and wherein the intermediate component enters the guiding route through an opening in the top platform of the lower arm.

9. The apparatus of claim 7, wherein the top surface of the intermediate component is in continuous contact with a curved surface at a bottom of the upper arm.

10. A threading and pulling method, comprising:
hingedly connecting, by a first hinge, a lower arm to an upper arm of an apparatus;
maintaining, by a spring, the apparatus in a non-operative state;
receiving, by a guiding route located below the upper arm and above the lower arm, a section of a threading cord; and
applying a grasping force by simultaneously pressing, during an operative state, the upper arm towards the lower arm on the section of the threading cord, wherein the grasping force is applied on the threading cord either directly by the upper arm and lower arm or indirectly by the upper arm activating an intermediate component, wherein the intermediate component comprises at a first end a bottom surface contacting the threading cord and a top surface that hingedly connects, via a second hinge, the intermediate component to the upper arm, wherein the bottom surface contacting the threading cord has a shape configured to fit the shape of the threaded cord in cross section along a length of the intermediate component parallel to the section of the threading cord.

11. A threading apparatus configured to be grasped, comprising:
a lower arm and an upper arm, wherein a first end of the lower arm is hingedly connected to a first end of the upper arm by a first hinge;
a telescopic elastic component connected between a second end of a top platform of the lower arm and a second end of upper arm maintaining the apparatus in a non-operative state;
a guiding route located below the upper arm and above the lower arm, the guided route configured to receive a section of a threading cord,
wherein, during an operative state, a simultaneous press of the upper arm towards the lower arm applies a grasping force on the section of the threading cord;
wherein the grasping force is applied on the threading cord either directly by the upper arm and the lower arm or indirectly by the upper arm activating an intermediate component; and
wherein the intermediate component comprises a bottom surface contacting the threading cord and a top surface that hingedly connects the intermediate component, via a second hinge, to the upper arm, wherein the bottom surface contacting the threading cord has a shape configured to fit the shape of the threaded cord in cross section along a length of the intermediate component parallel to the section of the threading cord.

12. The apparatus of claim 11, wherein the intermediate component is located between a respective one of the upper arm or the lower arm and the threading cord.

13. The apparatus of claim 11, wherein the upper arm that activates the intermediate component.

14. The apparatus of claim 11, wherein sa the shape is an inverted-V.

15. The apparatus of claim 11, wherein the guiding route is located within the lower arm, and the lower arm further comprising extensions for maintaining the threading cord within the guiding route.

* * * * *